United States Patent
Jaspers

(10) Patent No.: US 6,741,736 B1
(45) Date of Patent: May 25, 2004

(54) HISTOGRAM EQUALIZATION

(75) Inventor: Cornelis A. M. Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/495,508

(22) Filed: Feb. 1, 2000

(30) Foreign Application Priority Data

Feb. 5, 1999  (EP) ............................................. 99200347

(51) Int. Cl.$^7$ ................................................. G06K 9/00
(52) U.S. Cl. ...................................... 382/169; 382/254
(58) Field of Search ................................ 382/162, 312, 382/167–169, 254, 274, 275; 358/518–522, 3.26–3.27; 348/671–675, 645, 712

(56) References Cited

U.S. PATENT DOCUMENTS 4,499,486 A  *  2/1985  Favreau et al. ............. 348/672
6,078,686 A  *  6/2000  Kim ........................... 382/167
6,101,294 A  *  8/2000  McCaffrey et al. ......... 382/312

FOREIGN PATENT DOCUMENTS

| BE | 1007609 A | 8/1995 | ........... H04N/50/60 |
|---|---|---|---|
| EP | 0652674 A2 | 5/1995 | ............ H04N/1/60 |
| JP | 690381 | 3/1994 | ............ H04N/5/20 |

* cited by examiner

Primary Examiner—Leo Boudreau
Assistant Examiner—Ishrat Sherali
(74) Attorney, Agent, or Firm—Michael J. Ure

(57) ABSTRACT

In a method of histogram equalization of an image signal (Y), a histogram of the image signal (Y) is determined (HC), the image signal (Y) is processed (HP) in dependence upon the histogram to obtain a modified signal (Ymod), and the modified signal (Ymod) is enhanced (E) where said modified signal (Ymod) falls below said image signal (Y). Preferably, the enhancement (E) is color saturation (RGBsat) dependent.

6 Claims, 3 Drawing Sheets

HISTOGRAM EQUALIZATION

The invention relates to a method and device for histogram equalization, and to a display apparatus and a pick-up apparatus comprising such a device.

JP-A-6-90,381 shows a gradation correction device in which a color signal is included as a parameter for gradation correction to obtain a more effective gradation correction. The device is provided with a color parameter calculation circuit weighting for correction to specific color information in addition to gradation correction by a brightness histogram using a luminance signal as a parameter and also with a color parameter correction table deciding a correction coefficient in response to the parameter. When a color signal is inputted and a color of a correction picture element is a color with a visual sensitivity, a correction arithmetic operation circuit increases the quantity of gradation correction. Thus, the dynamic range of a luminance signal is extended in matching with the visual characteristic of the color signal and the gradation is more effectively corrected.

It is, inter alia, an object of the invention to provide an improved color reproduction in case of luminance histogram equalization for colored images. To this end, the invention provides a histogram equalization method and device, as well as a camera and a display apparatus comprising such a device, as defined in the independent claims. Advantageous embodiments are defined in the dependent claims.

In a method of histogram equalization of an image signal in accordance with the present invention, a histogram of the image signal is determined, the image signal is processed in dependence upon the histogram to obtain a modified signal, and the modified signal is enhanced where said modified signal falls below said image signal. Preferably, the enhancement is color saturation dependent.

BE patent 1007609 (Attorneys' docket PHN 14,585) discloses a color compensation algorithm for the non-linear transfer of the histogram converter which is applied in the histogram conversion IC's TDA9170, TDA9171 and TDA9178. The goal of this compensation is to restore in the RGB color space the u'v' color coordinates of each pixel without effecting the luminance of the histogram converter. The u'v' color space is the top view of the RGB color space of FIG. 2, so a 2D color space that does not take into account the vertical (RGBmax) direction. That color compensation should not be confused with the luminance restoration for rich colored parts as described herein below.

These and other aspects of the invention will be apparent from and elucidated with reference to the embodiments described hereinafter.

This invention mainly relates to improving the color reproduction in case of histogram equalization for colored images. In the upper part of FIG. 1, an example is shown of the luminance histogram of a certain imaginary image. The luminance input range of the signal Yin is divided here in 8 equal histogram segments. The vertical direction of the histogram indicates the number of counted pixels of which the gray values have matched within each segment. If the total image has been measured then summing the count value of all the segments is equal to the total number of pixels of the image.

The lower part shows the cumulative histogram transfer curve for achieving the luminance output signal Yout having an improved contrast. The thin line shows a linear transfer, while the fat line shows a non-linear transfer. Especially the contrast of the segments 5 and 6 is increased at the cost of the segments 1 till 4 and 8. There where the luminance transfer of Yout is lower then the linear transfer, the luminance output of rich colored image parts is dramatically decreased. With rich colored is meant that the colors have a relative high saturation.

The objective now is that, under the condition that Yout is smaller than Yin, the luminance level of the rich colored image parts is restored towards the linear transfer level as function of the amount of saturation. Therefore it is necessary to measure of each pixel the saturation level in the YUV color space in which the histogram converter is acting.

Figure 2:
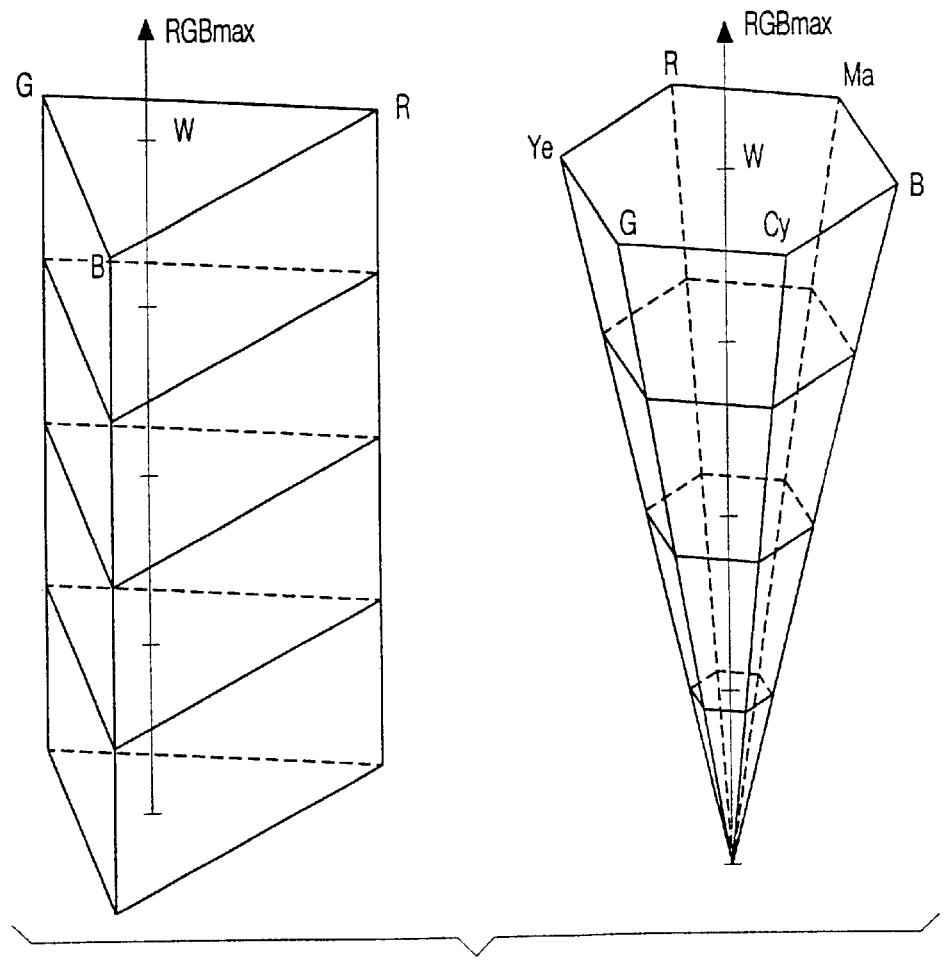
FIG. 2 shows the 3D RGB and YUV color space.

FIG. 2 shows the three dimensional (3D) color space for the RGB signals on the left side and for the YUV signals on the right side. Due to the translation from RGB to YUV signals, a completely different shape of the YUV color space occurs.

The cone shape of the YUV space can easily be explained with an example. If we suppose that R=G=0 and B=¼, then a 100% saturated blue color is meant. In the RGB space, this color vector lies on ¼ of the height in FIG. 2 having a length equal to WB, the White-Blue distance. For the YUV space of course the same height is applied, but the amplitude of the blue vector has become ¼ of the blue vector in the upper area. For that maximum Blue vector B=1, so Y=0.11 and R−Y=−0.11, B−Y=0.89. For B=¼, however, it holds that: Y=$0.11$/4 and that R−Y=−$0.11$/4, B−Y=$0.89$/4. The WB vector has become a length of ¼ of the maximum WB vector.

So, in the RGB space the saturation of an arbitrary color is a constant as function of the vertical parameter RGBmax. In the YUV space, however, a constant amount of saturation as function of RGBmax has become proportional to RGBmax. In other words: the amplitude of the color difference signals is proportional to RGBmax for a constant amount of color saturation. It is often thought that a small saturation amplitude corresponds with a desaturated color. But as can be seen in the YUV shape a small saturation amplitude can correspond with a 100% saturated color as well. This depends on the value of RGBmax.

It is important to realize that the vertical parameter in both color spaces is not the luminance signal Y, but RGBmax, i.e. the maximum value of the three RGB signals. Also this is easy to understand with an example. Suppose that R=G=0 and B=1, being a 100% saturated blue color. For the luminance signal it then holds that Y=0.11 and RGBmax (=B)=1. In case that R=B=0 and G=1 it holds that Y=0.59 and RGBmax (=G)=1 again. If Y were the vertical parameter, which is of course possible, a very strange RGB and YUV space would be the result. For the blue colors the maximum vertical height would be 0. 11, for green 0.59, for red 0.3 and for white 1.0. Such kind of a space is difficult to work with, therefore the maximum of the three RGB signals is chosen as vertical parameter, which, as this example shows, gives the easy to work with 3D color spaces of FIG. 2.

For the calculation of the saturation the parameter RGBmin, the minimum of the three RGB signals plays an important role as well. For 100% saturated colors it holds that RGBmin should be zero. This means that RGBmin is zero for the outer surfaces of the color spaces in FIG. 2. If RGBmin is equal to RGBmax, then the color saturation is zero. The corresponding color gray or white is represented by the vertical axis in FIG. 2. It will be clear that the color saturation is proportional to the difference of RGBmax and RGBmin. Because the saturation has to be independent of the RGBmax value, the formula for the saturation, which is called RGBsat, becomes: RGBsat=(RGBmax−RGBmin)/ RGBmax. So, for the calculation of RGBsat a divider is required.

Having the saturation RGBsat available, it has become possible to explain the luminance enhancement of rich colored scene parts in case of histogram equalization.

Figure 1:
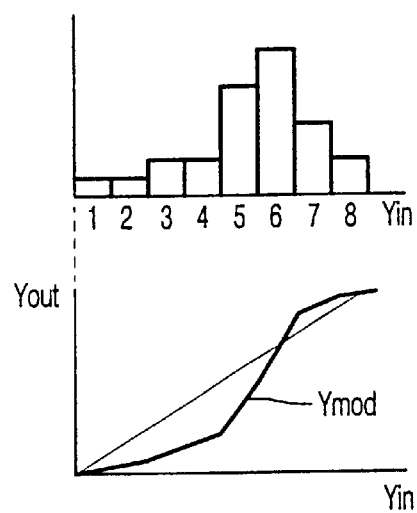
FIG. 1 shows an example of a luminance histogram and its cumulative non-linear transfer.
Figure 3:
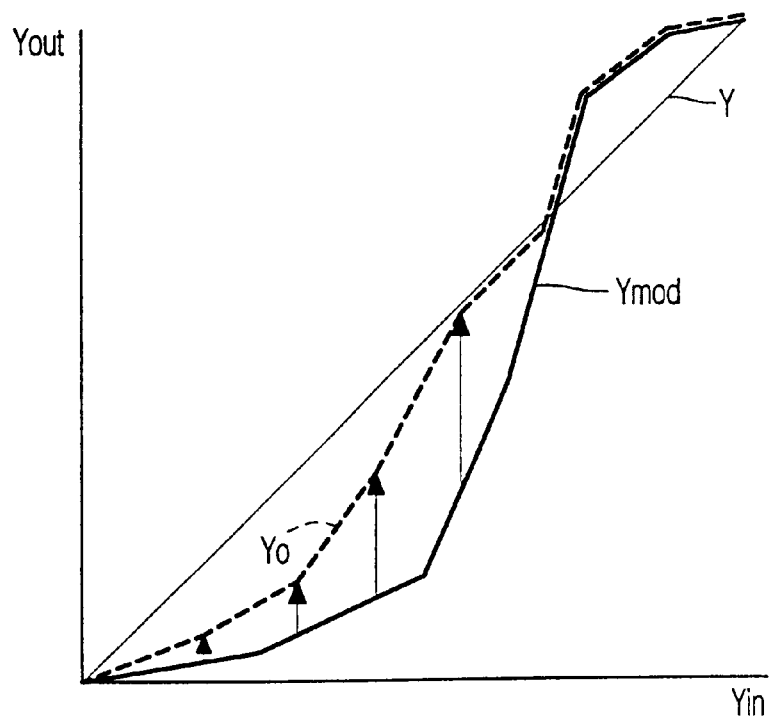
FIG. 3 illustrates luminance correction of rich colored scene parts in accordance with the present invention.

FIG. 3 shows the non-linear transfer of FIG. 1, but then somewhat enlarged. The curve Y is the linear transfer of the input signal Yin, while curve Ymod is the modified luminance transfer characteristic of the histogram converter. If Ymod is smaller then Y, then a luminance loss occurs at rich colored scene parts. In that case, as function of the measured RGBsat value of each pixel in the image, the transfer Ymod of that pixel is modified towards the linear transfer. If RGBsat=0 no correction happens, while if RGBsat=1 a full correction happens to the linear transfer. If the local RGBsat is somewhere between 0 and 1, then the luminance correction is proportional to the difference of (Y−Ymod). So if Ymod<Y then Yo=Ymod+(Y−Ymod)*RGBsat. The arrows in FIG. 3 show the luminance correction at an increasing RGBsat from 0 to 1.

By some extra amplification of the measured RGBsat value, with a parameter called RGBsatgain, it is even possible to restore the original linear luminance level for colors having their saturation level below one. If that new RGBsat value is not limited to one, then the luminance correction will supersede the linear transfer. Whether this is desired or not, depends on the subjective perception. Not limiting to one can become unattractive if the image contains already oversaturated colors. Those colors will get then extra luminance as well, what can make them more unnatural. Oversaturated colors occur if RGBmin is smaller than zero. In that case colors outside the color space have to be reproduced.

The next part of the description relates to the algorithm of the luminance correction of rich colored scene parts in case histogram conversion is applied. Supposed to be available are: the RGB color signals, the luminance signal Y, the color difference signals R_Y and B_Y (without reduction factors) and the histogram converter output signal Ymod. RGBmax, RGBmin, RGBsat and the new output signal Yo will be calculated as function of the saturation.

| Declaration of the used variables | |
|---|---|
| R, G, B | {the RGB signals} |
| Y | {the luminance signal} |
| Ymod | {modified Y via histogram converter} |
| R-Y, B-Y | {color difference signals} |
| RGBmax, RGBmin | {max and min of RGB signals} |
| RGBsat | {color saturation} |
| RGBsatgain | {extra saturation} |
| { find RGBmax and RGBmin} | |
| RGBmax = R | |
| if RGBmax < G then RGBmax = G | |
| if RGBmax < B then RGBmax = B | |
| RGBmin = R | |
| if RGBmin > G then RGBmin = G | |

| -continued | |
|---|---|
| Declaration of the used variables | |
| if RGBmin > B then RGBmin = B | |
| { calculate RGBsat } | |
| if RGBmax <= 0 then RGBsat = 0 | {prevent division by zero} |
| else | |
| RGBsat = RGBsatgain * (RGBmax − RGBmin) / RGBmax | |
| if RGBsat > 1 then RGBsat = 1 | {limit RGBsat to 1} |
| { correct the output signal Yo} | |
| if Ymod < Y then Yo = Ymod + (Y − Ymod) * RGBsat else Yo = Ymod | |

After the previous algorithm, which adapts Ymod as f(RGBsat), the color compensation for the nonlinear transfer of the histogram can be executed. Its algorithm is given here below:

```
{ declaration of other variables than those mentioned before }
fulcolcomp      { way of color compensation due to non-linear Ymod }
gsat            { temporary saturation correction }
poscolcomp      { compensation for desaturation only }
{ color compensation as function of non-linear transfer, a selection is
possible by fulcolcomp }
case fulcolcomp of
    1: gsat = 1        {NO color compensation}
    2: gsat = 1 + Cgain*(Ymod−Y)    { used in TDA9170/78,
    Cgain is optional }
    3:       { a divider is required }
             if Y > 0 then    { prevent division by zero
             gsat = Ymod / Y { full compensation}
             else gsat = 0
             if gsat > 10 then gsat = 10 {limit gain of gsat
end     {of fulcolcomp case}
{ compensation for desaturation only, this happens if Ymod>Y, maintain
the extra saturation if Ymod<Y }
if poscolcomp and (gsat < 1) then gsat = 1
{ calculate new R_Y and B_Y values }
R_Y = gsat * R_Y
B_Y = gsat * B_Y
```

The most difficult part for the realization of this luminance restoration for rich colored details, is the divider, so the realization of (1/RGBmax). In practice the divider will have its limitations: dividing by zero and almost zero will not be possible. Simulations made however clear that even with a limited divider (a maximum division till 1/0.2), the picture improvement is hardly influenced. It should be taken into account that the divider should remain well defined beyond that maximum limit.

In case of an analog environment a divider till 1/0.2 must be possible. Circuits able to do that, are known. In case of a digital environment the divider characteristic can be stored and retrieved in a look up table.

The next part of the description relates to an alternative for the RGBsat function using an inverse hyperbolic sine function. The inverse hyperbolic sine function, $\sinh^{-1}$, is very easy to realize in analog environment; it has been used as a gamma function for LCD'S, CRT's and cameras. For $\sinh^{-1}$ it holds that $$\sinh^{-1}(g, x) = \ln\{gx + [(gx)^2 + 1]^{0.5}\}$$

The value g can be fitted to an equivalent exponent of a power function. For an exponent of 0.25, which is applied here, the parameter g becomes 27.32.

It appears that the function RGBsat=(RGBmax−RGBmin)/RGBmax can be approximated by RGBsat= $\sinh^{-1}$ (RGBmax−RGBmin), so that x=(RGBmax−RGBmin) and the exponent to fit with 0.25. Now a divider circuit is no longer required. The simulation result on several images were less then with a (limited) divider circuit, but still very worthwhile, especially if RGBsatgain is somewhat increased.

As to noise, the perceptive impression was better with than without the RGBsat luminance correction using a (limited) divider circuit. The same holds for the $\sinh^{-1}$ function, but RGBsatgain should not be too large.

Figure 4:
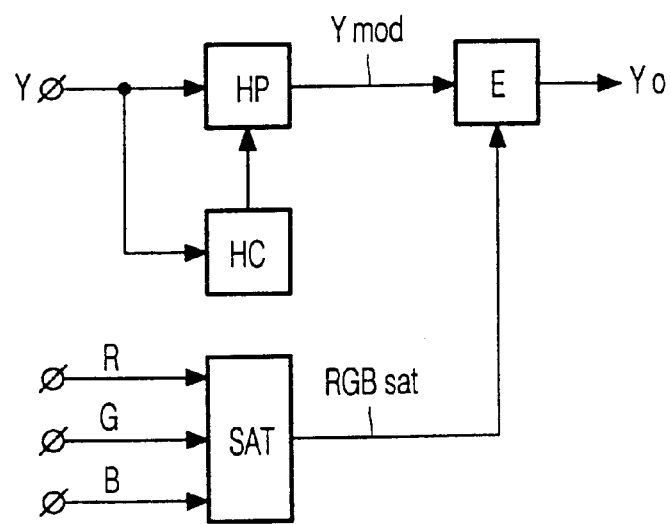
FIG. 4 shows an embodiment of a histogram-based enhancement device in accordance with the present invention.

FIG. 4 shows an embodiment of a histogram-based enhancement device in accordance with the present invention. A luminance signal Y is applied to a histogram calculation circuit HC to obtain its histogram. The luminance signal Y is histogram-dependently processed in an histogram-dependent processor HP to obtain a modified signal Ymod in dependence upon the calculated histogram. The modified signal Ymod is then enhanced in an enhancement circuit E to obtain an output signal Yo based on a color saturation signal RGBsat that is obtained by a saturation calculation circuit SAT from the color signals RGB.

As both Y and RGB are necessary, Y must be obtained from input RGB signals, or RGB must be obtained from input YUV signals by means of the well-known conversion formulae. Also, UV must be compensated for the change from Y to Yo. All this is not shown as the invention is primarily concerned with these features.

Figure 5:
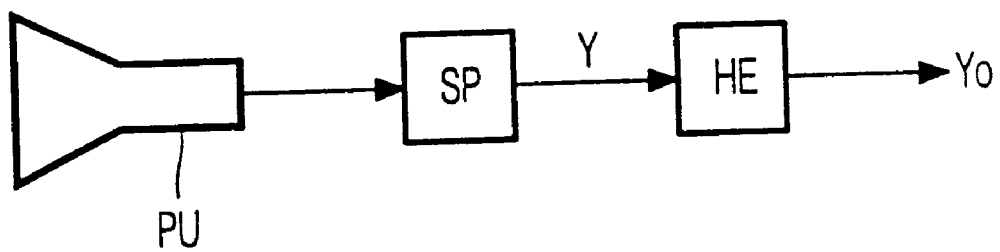
FIG. 5 shows an embodiment of a camera in accordance with the present invention.

FIG. 5 shows an embodiment of a camera in accordance with the present invention. A pick-up unit (image sensor) PU supplies a signal to a signal processor SP to obtain a luminance signal Y. A histogram-based enhancement circuit HE of the type shown in FIG. 4 supplies an output signal Yo on the basis of the luminance signal Y.

Figure 6:
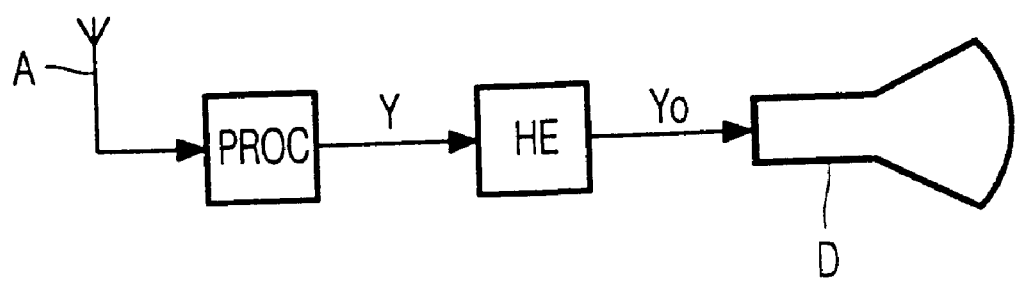
FIG. 6 shows an embodiment of a display apparatus in accordance with the present invention.

FIG. 6 shows an embodiment of a display apparatus in accordance with the present invention: A television signal obtained by an antenna A is applied to a processor PROC to obtain a luminance signal Y. A histogram-based enhancement circuit HE of the type shown in FIG. 4 supplies an output signal Yo on the basis of the luminance signal Y. The output signal Yo is applied to a display D.

The following features of preferred embodiments are noteworthy. The calculation of the saturation in the RGB and YUV three dimensional color space. The local restoration of the luminance of rich colored scene parts as function of the calculated saturation in case of a pixel the histogram output is lower than the linear transfer. The amplification of the calculated saturation with an extra gain in order to compensate colors that are less than maximally saturated. The possibility of overcompensation of the luminance of rich colored scene parts. The realization of the alternative for the divider by using an inverse hyperbolic sine function.

A primary aspect of this invention can be summarized as follows. By means of measuring the luminance histogram of an image it is possible to improve the contrast by means of the so called 'histogram equalization' method. This means that the most important parts of the histogram will be spread over a larger number of gray values then they originally occupied. Because the maximum signal amplitude is maintained the number of gray levels of the less important histogram parts are reduced in order to get them available for the most important histogram part. As a result the less important histogram parts achieve less contrast.

As an example a scene is supposed having small but very rich colored details of a relative low luminance level. The dominating part of the scene consists of gray values with relative higher luminance levels. For this image contrast improvement will happen at the cost of the luminance of the colored details.

Even if an histogram converter is applied with an ideal color compensation for the non-linear luminance transfer, the luminance of the colored details still will be too low although its color coordinates are unchanged. The colored details will have the same color as the original, but at a lower luminance level. If one realizes that the supposed scene is not unique at all and that the human eye is attracted by rich colors, then the possibility of luminance losses for rich colored scene parts is a true disadvantage of the luminance histogram equalization method.

This application describes a method which compensates the luminance loss of rich colored image parts. It eliminates the mentioned drawback of luminance histogram conversion on colored images.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A method of histogram equalization of an image signal, the method comprising the steps:

determining a histogram of a luminance component of the image signal;

processing said luminance component in dependence upon said histogram to form a modified signal; and enhancing said modified signal where said modified signal falls below said luminance component.

2. The method as claimed in claim 1, wherein said enhancing step depends on a color saturation of said image signal.

3. A method of histogram equalization of an image signal, the method comprising the steps:

determining a histogram of a luminance component of the image signal;

processing said luminance component in dependence upon said histogram to form a modified signal; and enhancing said modified signal where said modified signal falls below said luminance component, wherein said enhancing step depends on a color saturation of said image signal, and wherein said color saturation is calculated using a hyperbolic sine function.

4. A device for histogram equalization of an image signal, the device comprising:

means for determining a histogram of a luminance component of the image signal;

means for processing said luminance component in dependence upon said histogram to form a modified signal; and means for enhancing said modified signal where said modified signal falls below said luminance component.

5. A camera, comprising:

a pick-up unit for providing a sensor output signal;

a processor for generating a luminance signal in response to the sensor output signal; and a histogram equalization device as claimed in claim 4 for generating an output signal in response to the luminance signal.

6. A display apparatus, comprising:

a processing unit for generating a luminance signal;

a histogram equalization device as claimed in claim 4 for generating an output signal in response to the luminance signal; and a display for displaying the output signal.

\* \* \* \* \*